US006998969B2

(12) United States Patent
Aiyama et al.

(10) Patent No.: US 6,998,969 B2
(45) Date of Patent: Feb. 14, 2006

(54) DOOR LOCK APPARATUS FOR VEHICLE

(75) Inventors: Takaya Aiyama, Kariya (JP); Koichi Hirota, Takahama (JP); Norikazu Kobayashi, Chita (JP); Takayuki Ohta, Kariya (JP); Koji Aoki, Nagoya (JP); Hidetoshi Kadoya, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 269 days.

(21) Appl. No.: 10/673,189

(22) Filed: Sep. 30, 2003

(65) Prior Publication Data

US 2004/0124027 A1 Jul. 1, 2004

(30) Foreign Application Priority Data

Sep. 30, 2002 (JP) ............................. 2002-284751

(51) Int. Cl.
*B60R 25/10* (2006.01)

(52) U.S. Cl. ................... 340/426.28; 340/436; 70/237; 180/271; 180/286; 296/68

(58) Field of Classification Search ................ 340/436, 340/428, 426.28, 426.3, 825.57, 825.71; 70/237; 180/271, 286; 296/68
See application file for complete search history.

(56) References Cited

U.S. PATENT DOCUMENTS 3,859,482 A * 1/1975 Matsui et al. ............ 200/61.08
5,769,471 A 6/1998 Suzuki et al.
5,894,906 A * 4/1999 Weber ......................... 180/274
6,662,608 B1 * 12/2003 Baukholt ..................... 70/264

FOREIGN PATENT DOCUMENTS

| | | | |
|---|---|---|---|
| DE | 196 35 741 | A | 3/1997 |
| DE | 197 50 979 | A | 6/1999 |
| EP | 1 347 133 | A | 9/2003 |
| GB | 2 331 328 | A | 5/1999 |
| JP | 6-129149 | A | 5/1994 |
| JP | 6-146688 | A | 5/1994 |
| JP | 2657874 | B2 | 6/1997 |

* cited by examiner

*Primary Examiner*—Jeffery Hofsass
*Assistant Examiner*—Daniel Previl
(74) *Attorney, Agent, or Firm*—Buchanan Ingersoll PC

(57) ABSTRACT

A door lock apparatus for a vehicle includes an outside switch provided outside of a vehicle for detecting an opening operation of a door from the outside of the vehicle, an actuator for releasing an engagement of a latch mechanism of the door, a control device electrically connected to the outside switch for driving the actuator in response to the opening operation of the door being detected by the outside switch, and a detecting device for detecting an impact added to the vehicle. When the detecting device detects the impact added to the vehicle, the control device disables the opening operation of the door being detected by the outside switch within a first predetermined time from the detection of the impact.

18 Claims, 4 Drawing Sheets

FIG. 2

| Operating switch / Mode | Outside SW | Inside SW | Hold-open latch release inside switch | Unlock SW | Lock SW |
|---|---|---|---|---|---|
| Normal | ○ | ○ | ○ | ○ | ○ |
| Error 1 | × | × | × | × | × |
| Error 2 | × | ○ | × | ○ | × |
| Error 3 | ○ | ○ | ○ | ○ | ○ |

DOOR LOCK APPARATUS FOR VEHICLE

This application is based on and claims priority under 35 U.S.C. § 119 with respect to Japanese Application No. 2002-284751 filed on Sep. 30, 2002, the entire content of which is incorporated herein by reference.

FIELD OF THE INVENTION

This invention generally relates to a door lock apparatus for a vehicle.

BACKGROUND OF THE INVENTION

Known door lock apparatus for a vehicle controls a vehicle door in a locked state so as to prevent an unintended door opening during the vehicle running state when the door lock apparatus detects the vehicle in a running state by a vehicle speed sensor. Under a normal running condition of the vehicle, the door lock apparatus controls the vehicle door in the locked state when detecting the vehicle speed reaching or exceeding a predetermined vehicle speed.

In addition, when impact is applied to the vehicle due to a collision and the like, the door lock apparatus is configured not to control the door in the locked state by the vehicle speed sensor so that an occupant is prevented from being trapped in the vehicle even if the vehicle starts running after the collision due to the effect of a downhill road and the like. Such vehicle door lock apparatus is disclosed in Japanese Patent Publication No. 2657874.

According to the disclosed door lock apparatus, when the vehicle door is permitted to open after the vehicle collision is detected, a door handle might be operated to open erroneously in case of an occurrence of the rollover after the collision.

Thus, a need exists for a door lock apparatus for a vehicle which can prevent an unintended door opening in case that the impact is applied to the vehicle.

SUMMARY OF THE INVENTION

According to an aspect of the prevent invention, a door lock for a vehicle apparatus includes an outside switch provided outside of a vehicle for detecting an opening operation of a door from the outside of the vehicle, and an actuator for releasing an engagement of a latch mechanism of the door. The vehicle door lock apparatus further includes a control means electrically connected to the outside switch for driving the actuator in response to the opening operation of the door being detected by the outside switch, and a detecting means for detecting an impact added to the vehicle. When the detecting means detects the impact added to the vehicle, the control means disables the opening operation of the door being detected by the outside switch within a first predetermined time from the detection of the impact.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 2 is a view explaining each mode of a main control portion;

DETAILED DESCRIPTION OF THE INVENTION

An embodiment of the present invention is explained referring to FIGS. 1 to 5 as follows.

Figure 1:
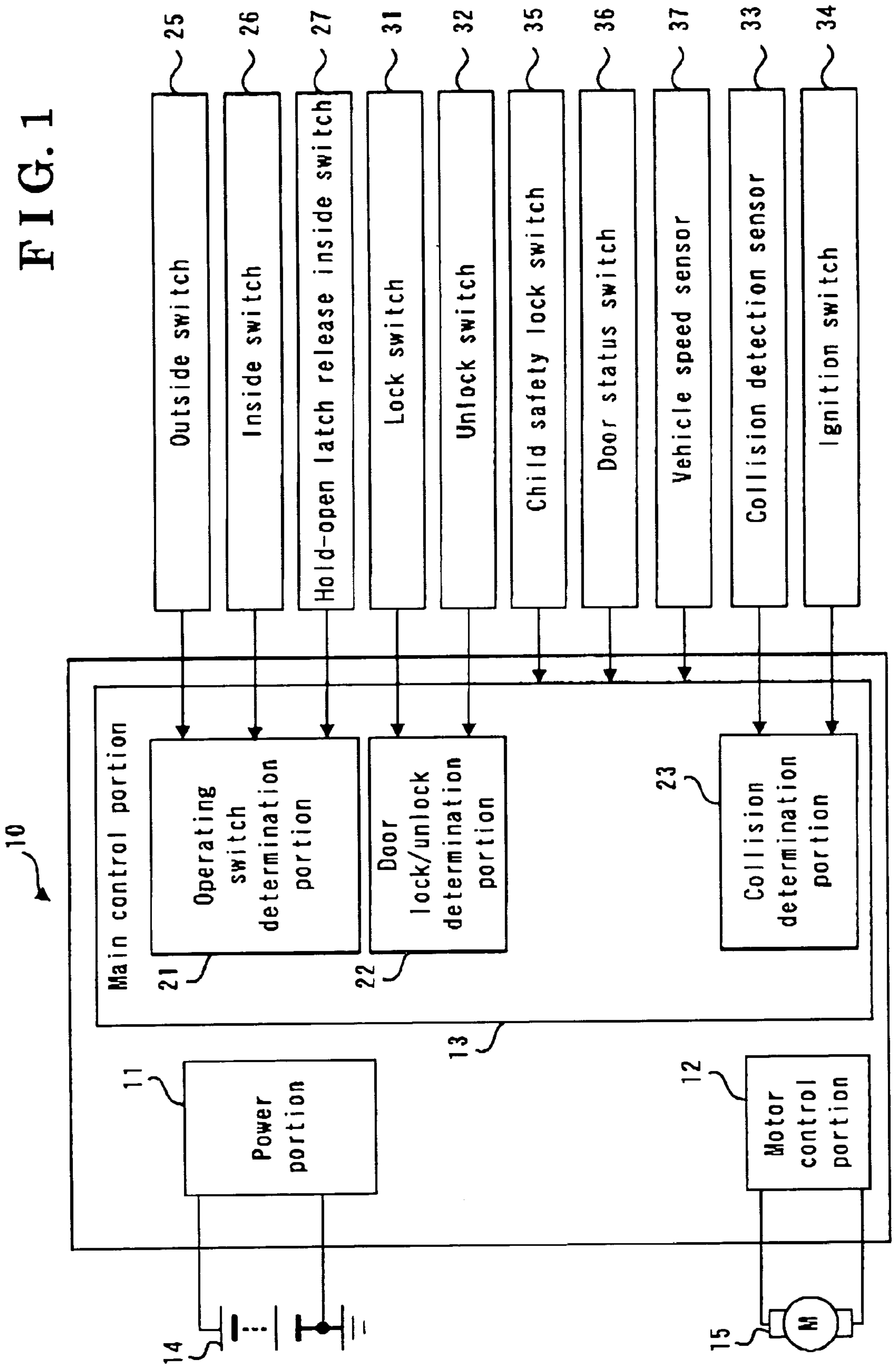
FIG. 1 is a block view showing an electrical structure of a door lock apparatus for a vehicle.

FIG. 1 is a block view showing an electrical structure of a vehicle door lock apparatus 10. The vehicle door lock apparatus 10 is employed in both a swing type door and a slide type door of a vehicle. As shown in FIG. 1, the vehicle door lock apparatus 10 includes a power portion 11, a motor control portion 12, and a main control portion 13 as a control means. The power portion 11 is connected to a DC power 14 and the main control portion 13. The power portion 11 serves as a driving power source of the main control portion 13 and converts a current supplied from the DC power 14 to a predetermined voltage or current for the main control portion 13. The motor control portion 12 is connected to the main control portion 13 and each motor 15 for controlling the motor 15 in response to a control signal sent from the main control portion 13. Each motor 15 is provided at each door of the vehicle and driven in response to a signal sent to each door from the motor control portion 12.

The motor 15 is employed to drive an actuator. An engagement of a latch mechanism between the vehicle body and the door is released by driving the actuator, thereby controlling the vehicle door possible to open. For the sliding door, the engagement of the latch mechanism between the vehicle body and the door is released by driving the actuator, which is caused by the motor being driven in both a fully closed state and a fully open state of the sliding door. That is, in the fully closed state of the sliding door, the sliding door is permitted to open by releasing the engagement of the latch mechanism between the vehicle body and the door. In the fully open state of the sliding door, on the other hand, the sliding door is permitted to close by releasing the engagement of the latch mechanism between the vehicle body and the door.

As mentioned above, the motor 15 releases the engagement of the latch mechanism between the vehicle body and the door by driving the actuator so that the door is permitted open or close. In addition, the main control portion 13 includes an operating switch determination portion 21, a door lock/unlock determination portion 22, and a collision determination portion 23. The main control portion 13 and the determination portions 21 to 23 receive various signals respectively. The main control portion 13 outputs the control signal to the motor control portion 12 based on the received signal.

As shown in FIG. 1, a child safety lock switch 35 of a known type, a door status switch 36, and a vehicle speed sensor 37 are connected to the main control portion 13. The child safety lock switch 35 sends an ON/OFF signal corresponding to an operating state (ON) and a non-operating state (OFF) of the child safety lock switch 35 to the main control portion 13 when the child safety lock switch 35 is switched to the ON or OFF state.

The main control portion 13 controls a rear seat door not to open by an operation of an inside handle by setting the child safety lock switch 35 in the ON state. That is, when the child safety lock switch 35 is in the ON state, the main control portion 13 disables a signal for driving the motor 15 being output from the operating switch determination portion 21.

The door status switch 36 detects whether the door is open or closed. The door status switch 36 inputs a detected signal corresponding to the door open/closed status to the main control portion 13. The vehicle speed sensor 37 detects a vehicle speed based on a rotational speed of a driving wheel and inputs the detected vehicle speed to the main control portion 13.

An outside switch 25 for detecting an opening operation of an outside handle, which is provided at an outside of the vehicle door, is connected to the operating switch determination portion 21. In addition, an inside switch 26 for detecting the opening operation of an inside handle, which is provided at an inner side of the vehicle door, and a hold-open latch release inside switch 27 are connected to the operating switch determination portion 21. The outside switch 25 and the inside switch 26 each input the ON/OFF signal to the operating switch determination portion 21 in response to each opening operation of the outside handle and the inside handle.

The hold-open latch release inside switch 27 provided only at the sliding door also inputs the ON/OFF signal to the operating switch determination portion 21 in response to the opening operation of the sliding door.

The operating switch determination portion 21 determines whether or not the driving of the motor 15 is required, i.e. the release of the engagement of the latch mechanism is required, based on the received ON/OFF signal. When it is determined that the engagement release of the latch mechanism is required, the operating switch determination portion 21 controls the door to open based on the lock/unlock state of the door input from the door lock/unlock determination portion 22 and a present mode of the main control portion 13 to be mentioned later.

The door lock/unlock determination portion 22 inputs a signal for changing a state of the opening operation of the door into a prohibited state or a permitted state to the operating switch determination portion 21 based on the ON/OFF signal input from a lock switch 31 and an unlock switch 32, and the mode of the main control portion 13.

In case that the door opening operation is prohibited, i.e. in the door locked state, the operating switch determination portion 21 is controlled so as not to output the control signal to the motor control portion 12. Thus, even when the operating switch determination portion 21 determines that the engagement of the latch mechanism requires to be released due to the ON/OFF signal from the switches 25 to 27, the operating switch determination portion 21 does not output the control signal to the motor control portion 12. The door is not opened since the motor 15 is not driven.

Meanwhile, in case that the door opening operation is permitted, i.e. in the door unlocked state, the operating switch determination portion 21 is controlled to be able to output the control signal to the motor control portion 12. Thus, when the operating switch determination portion 21 determines that the engagement of the latch mechanism requires to be released due to the ON/OFF signal from the switches 25 to 27, the operating switch determination portion 21 outputs the control signal to the motor control portion 12. The door is then opened since the motor 15 is driven.

A collision detection sensor 33 as a detecting means and an ignition switch 34 are connected to the collision determination portion 23. The collision detection sensor 33 detects the impact added to the vehicle caused by the collision and the like by a G sensor. When the G sensor detects the impact, the collision detection sensor 33 inputs a signal indicating the occurrence of the vehicle collision to the collision determination portion 23.

The ON/OFF state of the ignition switch 34 is switched based on whether or not a key plate is inserted into a key cylinder for the engine start. The ignition switch 34 inputs the ON/OFF state thereof to the collision determination portion 23.

The collision determination portion 23 changes the mode of the main control portion 13 based on the signal input from the collision detection sensor 33 and the ignition switch 34. The main control portion 13 controls the signal input from the switches 25 to 27, 31, and 32 connected to the operating switch determination portion 21 and the door lock/unlock determination portion 22 according to the mode of the main control portion 13. The main control portion 13 controls to enable or disable the input signal from the switches 25 to 27, 31, and 32.

The main control portion 13 is normally set in a normal mode. The collision determination portion 23 switches the mode of the main control portion 13 to an error mode 1 when the collision detection sensor 33 detects the impact added to the vehicle under the ignition switch 34 in the ON state. At the same time, the collision determination portion 23 activates a collision detection timer to measure an elapsed time from the mode of the main control portion 13 being switched to the error mode 1. The collision determination portion 23 switches the mode of the main control portion 13 to an error mode 2 and then an error mode 3 in response to the elapsed time from the mode being switched to the error mode 1.

In FIG. 2, valid signals input from the switches 25 to 27, 31 and 32 in each mode selected by the collision determination portion 23 of the main control portion 13 are indicated with "○". In addition, invalid signals input from the switches 25 to 27, 31 and 32 are indicated with "X". When the signal is defined as invalid, that signal is not effective on the door lock control.

Each mode of the main control portion 13 is explained in the following. In the normal mode, the input signals from the switches 25 to 27, 31 and 32 are all valid. Thus, the main control potion 13 performs controlling in response to the input signal from the switches 25 to 27, 31 and 32.

In the error mode 1, the input signals from the switches 25 to 27, 31 and 32 are all invalid. The main control portion 13 disables the signal for changing the lock/unlock state of the door, and also the signal for requiring the release of the engagement of the latch mechanism by the ON/OFF signal input from the outside switch 25, the inside switch 26, and the hold-open latch release inside switch 27. Thus, the engagement of the latch mechanism is not released, thereby prohibiting the door to be opened from the closed state.

In the error mode 2, the signals from the inside switch 26 and the unlock switch 32 are only valid. The main control portion 13 is thus able to operate the door from the locked state to the unlocked state. In addition, the door can be opened by the input of the ON/OFF signal from the inside switch 26 when the door is in the unlocked state.

Whereas, the signal input from the lock switch 31 is invalid and thus the main control portion 13 is unable to operate the door from the unlocked state to the locked state. In addition, since the signal input from the outside switch 25 and the hold-open latch release inside switch 27 is invalid, the main control portion 13 is unable to open the door by the input of the ON/OFF signal from the outside switch 25 and the hold-open latch release inside switch 27.

In the error mode 3, all signals input from the switches 25 to 27, 31, and 32 are all valid, which is the same condition as the normal mode. The main control portion 13 performs the controlling in response to the input signal from the switches 25 to 27, 31 and 32.

Figure 3:
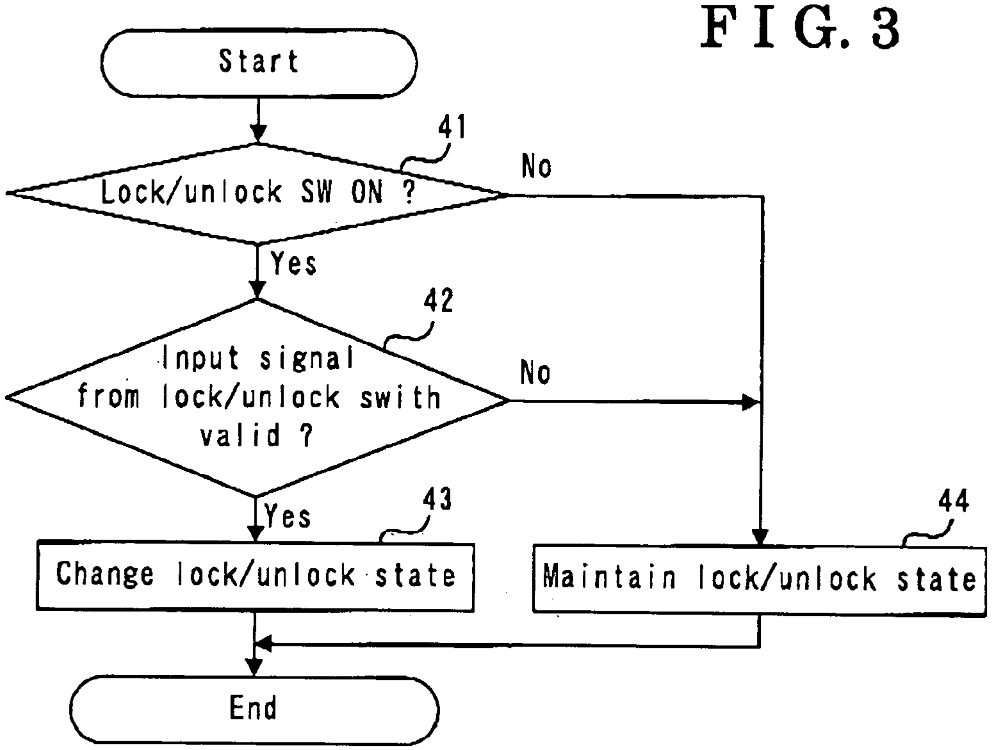
FIG. 3 is a flowchart showing a door lock procedure.

A door lock control by the door lock/unlock determination portion 22 is explained referring to a flowchart of FIG. 3. When an operation proceeds to a routine of the flowchart, the door lock/unlock determination portion 22 determines whether or not the ON/OFF signal is input from the lock switch 31 or the unlock switch 32 in Step 41. When the door lock/unlock determination portion 22 determines that the signal is input from the lock switch 31 or the unlock switch 32, the operation proceeds to Step 42.

In Step 42, the door lock/unlock determination portion 22 determines whether or not the input signal from the lock switch 31 or the unlock switch 32 is valid in the mode of the main control portion 13 at that time. When the door lock/unlock determination portion 22 determines that the input signal from the lock switch 31 or the unlock switch 32 is valid, the operation proceeds to Step 43.

In Step 43, the door lock/unlock determination portion 22 changes the lock/unlock state of the door depending on the signal input from the switch 31 or 32, and then terminates the present routine.

Meanwhile, when the door lock/unlock determination portion 22 determines that the ON/OFF signal is not input from the lock switch 31 or the unlock switch 32 in Step 41, the operation proceeds to Step 44. Further, when the door lock/unlock determination portion 22 determines that the signal input from the lock switch 31 or the unlock switch 32 is invalid in the mode of the main control portion 13 in Step 42, the operation proceeds to Step 44.

In Step 44, the door lock/unlock determination portion 22 maintains the lock/unlock state of the door at that time and then terminates the present routine.

Figure 4:
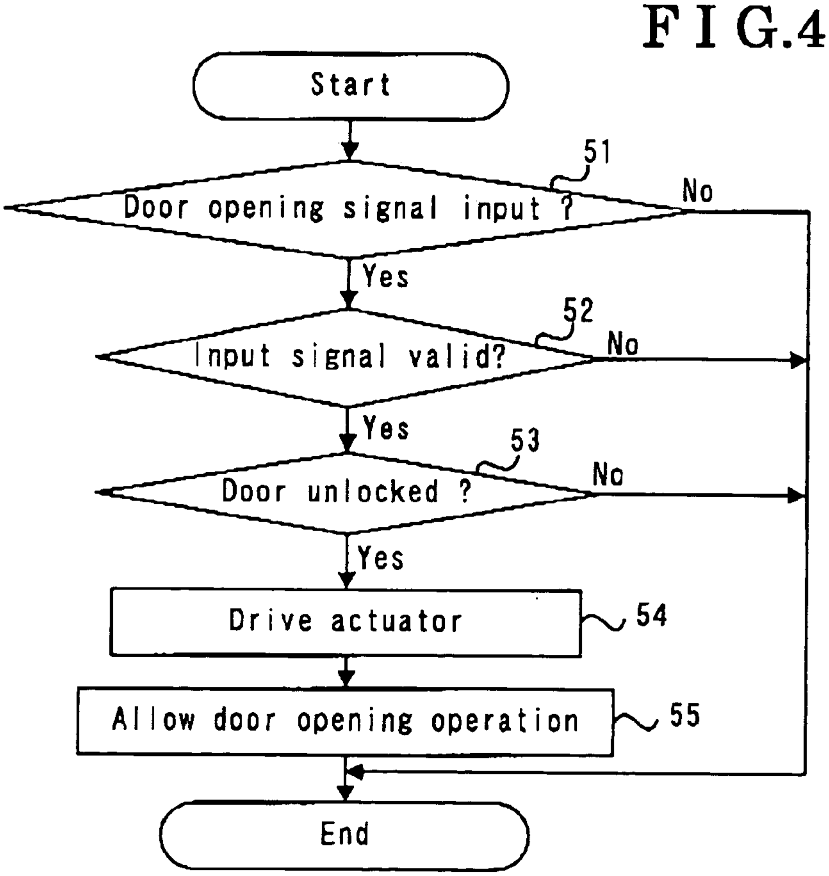
FIG. 4 is a flowchart showing a door opening procedure.

Next, a door opening operation by the operating switch determination portion 21 is explained referring to a flowchart of FIG. 4.

When the operation proceeds to a routine of the flowchart of FIG. 4, the operating switch determination portion 21 determines whether or not the signal for operating the door is input from the outside switch 25, the inside switch 26, or the hold-open latch release inside switch 27 in Step 51. When it is determined that the signal for opening the door is not input, the operating switch determination portion 21 terminates the present routine.

On the other hand, when it is determined that the signal for opening the door is input from the outside switch 25, the inside switch 26 or the hold-open latch release inside switch 27 in Step 51, the operation proceeds to Step 52.

In Step 52, the operating switch determination portion 21 determines whether or not the signal input from any one of the switches 25 to 27 is valid in the mode of the main control portion 13. When it is determined that the input signal is invalid, the operating switch determination portion 21 then terminates the present routine.

Meanwhile, when the operating switch determination portion 21 determines that the signal input from any one of the switches 25 to 27 is valid in Step 52, the operation proceeds to Step 53.

In Step 53, the operating switch determination portion 21 determines whether the door is in the locked state or the unlocked state by the signal input from the door lock/unlock determination portion 22. When it is determined that the door is in the locked state, the operating switch determination portion 21 then terminates the present routine.

Whereas, when the operating switch determination portion 21 determines that the door is in the unlocked state in Step 53, the operation proceeds to Step 54.

In Step 54, the operating switch determination portion 21 inputs the signal for driving the motor 15 to the motor control portion 12, thereby driving the actuator. The operation then proceeds to Step 55.

In Step 55, the latch mechanism between the vehicle body and the door becomes disengaged due to the driving of the actuator in Step 54. As a result, the door opening operation is possible. The operating switch determination portion 21 terminates the present routine.

Figure 5:
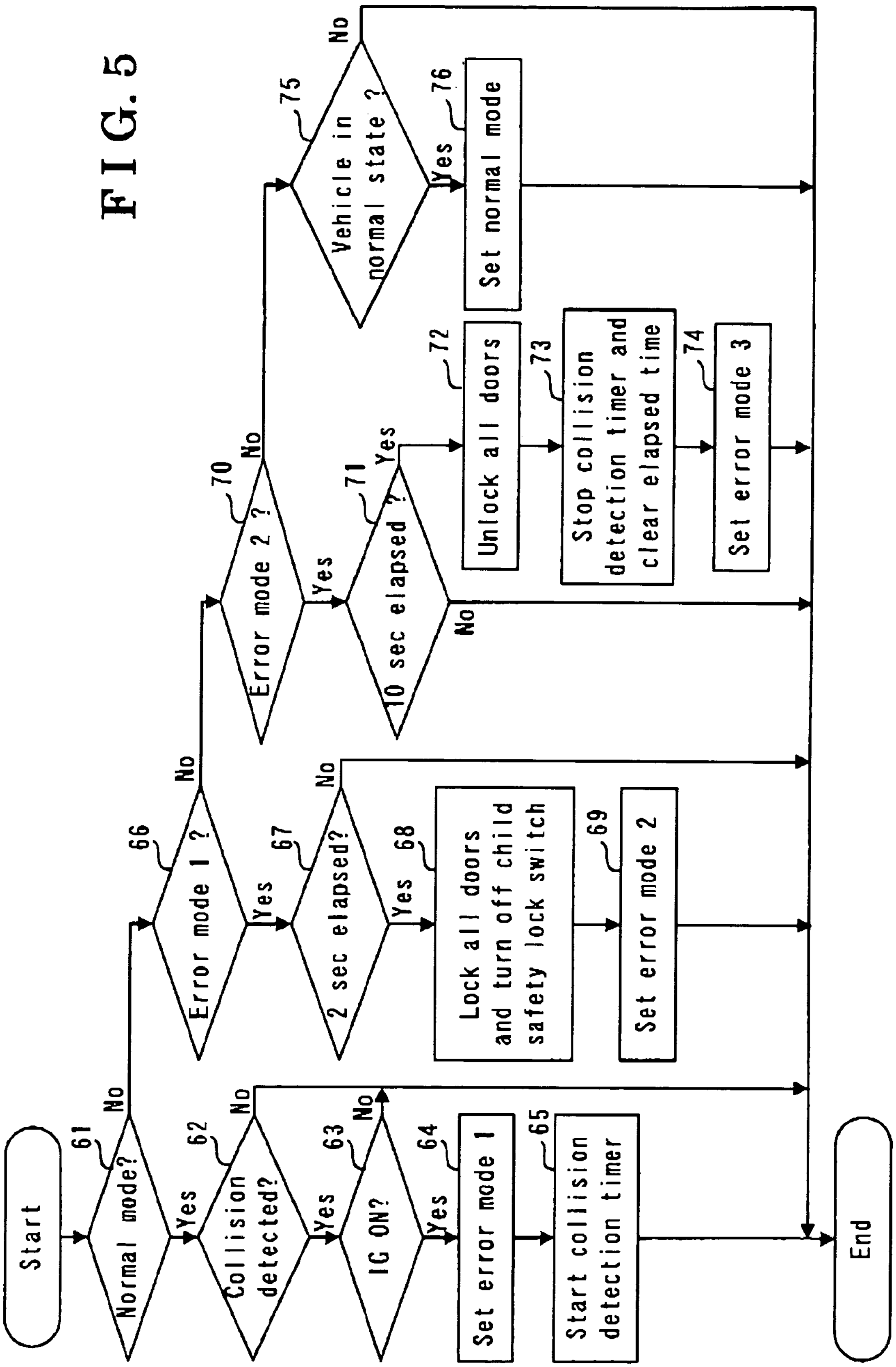
FIG. 5 is a flowchart showing a changing procedure of each mode of the main control portion.

A mode change procedure of the main control portion 13 by the collision determination portion 23 is explained referring to a flowchart of FIG. 5. This procedure is performed at predetermined intervals by interruption.

When the operation proceeds to a routine of the flowchart of FIG. 5, the collision determination portion 23 determines whether or not the main control portion 13 is in the normal mode in Step 61. When the collision determination portion 23 determines that the main control portion 13 is in the normal mode, the operation proceeds to Step 62.

In Step 62, the collision determination portion 23 determines whether or not the vehicle collision is detected by the collision detection sensor 33. When the vehicle collision is not detected, the collision determination portion 23 terminates the present routine.

Meanwhile, when the collision determination portion 23 determines that the vehicle collision is detected, the operation proceeds to Step 63.

In Step 63, the collision determination portion 23 determines whether or not the ignition switch 34 is in the ON state. When it is determined that the ignition switch 34 is in the OFF state, the collision determination portion 23 terminates the present routine.

Whereas, when the collision determination portion 23 determines that the ignition switch 34 is in the ON state in Step 63, the operation proceeds to Step 64.

In Step 64, the collision determination portion 23 switches the mode of the main control portion 13 to the error mode 1. The operation then proceeds to Step 65. In Step 65, the collision determination portion 23 starts to activate the collision detection timer and terminates the present routine.

Further, when the collision determination portion 23 determines that the main control portion 13 is not in the normal state in Step 61, the operation proceeds to Step 66.

In Step 66, the collision determination portion 23 determines whether or not the main control portion 13 is in the error mode 1. When the collision determination portion 23 determines that the main control portion 13 is in the error mode 1, the operation proceeds to Step 67.

In Step 67, the collision determination portion 23 determines whether or not the elapsed time measured by the collision detection timer is 2 seconds or more. When it is determines that that the elapsed time is less than 2 seconds, the collision determination portion 23 terminates the present routine.

Meanwhile, when the collision determination portion 23 determines that the elapsed time is 2 seconds or more in Step 67, the operation proceeds to Step 68. In Step 68, the collision determination portion 23 controls the all doors provided at the vehicle in the locked state and also controls the child safety lock switch 35 in the OFF state. The operation then proceeds to Step 69.

In Step 69, the collision determination portion 23 switches the mode of the main control portion 13 to the error mode 2 and then terminates the present routine. In addition, when the collision determination portion 23 determines that the main control portion 13 is not in the error mode 1 in Step 66, the operation proceeds to Step 70.

In Step 70, the collision determination portion 23 determines whether or not the main control portion is in the error mode 2. When the collision determination portion 23 determines that the main control portion 13 is in the error mode 2, the operation proceeds to Step 71.

In Step 71, the collision determination portion 23 determines whether or not the elapsed time measured by the collision detection timer is 10 seconds or more. When it is determined that the elapsed time is less than 10 seconds, the collision determination portion 23 terminates the present routine.

Meanwhile, when the collision determination portion 23 determines that the elapsed time is 10 seconds or more in Step 71, the operation proceeds to Step 72. In Step 72, the collision determination portion 23 controls the all doors provided at the vehicle in the unlocked state. The operation then proceeds to Step 73.

In Step 73, the collision determination portion 23 stops measuring of the elapsed time by the collision detection timer and clears a measured value of the elapsed time. The operation then proceeds to Step 74.

In Step 74, the collision determination portion 23 switches the mode of the main control portion 13 to the error mode 3 and terminates the present routine. On the other hand, when the collision determination portion 23 determines that the main control portion 13 is not in the error mode 2 in Step 70, the operation proceeds to Step 75.

In Step 75, the collision determination portion 23 determines whether or not the vehicle is in the normal condition. The normal condition of the vehicle is determined based on the ON/OFF state of the ignition switch 34, the door opening/closing state defined by the door status switch 36, the input signal from the vehicle speed sensor 37, and the input signal from the collision detection sensor 33. When the collision determination portion 23 determines that the input signals from the ignition switch 34, the door status switch 36, the vehicle speed sensor 37 and the collision detection sensor 33 correspond to the signals to be detected in the normal state of the vehicle, the vehicle is determined in the normal state. The operation then proceeds to Step 76.

In Step 76, the collision determination portion 23 switches the mode of the main control portion 13 to the normal mode and terminates the present routine. On the other hand, when it is determined that the vehicle is not in the normal state in Step 75, the collision determination portion 23 terminates the present routine.

According to the present embodiment, the collision determination portion 23 switches the mode of the main control portion 13 to the error mode 1 when the vehicle collision is detected and also the ignition switch 34 is in the ON state. The input signals from the switches 25 to 27, 31 and 32 are all brought to be invalid. For 2 seconds after the vehicle collision is detected, i.e. by the switching to the error mode 2, the unintended door opening due to the wrong operation of the outside switch 25 and the inside switch 26 may be avoided. That is, when the switching time to the error mode 2 is set such that until which the opening operation of the door is normally considered not to be performed from the outside of the vehicle, the unintended door opening due to the wrong operation of the outside switch 25 may be avoided.

In addition, the main control portion 13 keeps disabling the input signal from the outside switch 25 and the hold-open latch release inside switch 27 until the mode of the main control portion 13 is switched to the error mode 3 under the condition that the vehicle collision is detected and also the ignition switch 34 is in the ON state. Thus, the unintended door opening due to the wrong operation of the outside switch 25 and the hold-open latch release inside switch 27 caused by the rollover of the vehicle and the like may be avoided. That is, when the switching time to the error mode 3 is set such that until which the opening operation of the door is normally considered not to be performed from the outside of the vehicle but to be performed from the inside of the vehicle after the mode is switched to the error mode 2, the unintended door opening due to the wrong operation of the outside switch 25 caused by the rollover of the vehicle and the like may be avoided. At the same time, the opening operation of the door is possible from the inside of the vehicle by the detection of the opening signal of the inside switch 26 caused by the intention of the occupant.

Further, the collision determination portion 23 controls all the doors provided at the vehicle in the locked state at the time of the mode of the main control portion 13 being switched to the error mode 2. Thus, the unintended door opening from the inside of the vehicle may be prevented. In addition, after the mode of the main control portion 13 is switched to the error mode 2, the input signals from the unlock switch 32 and the inside switch 26 become valid. The vehicle occupant can thus open the door from the inside of the vehicle by operating the inside switch 26 after operating the unlock switch 32, thereby assuring the occupant to escape from the inside of the vehicle. That is, when the switching time to the error mode 2 is set such that until which the opening operation of the door is not normally considered to be performed from the inside of the vehicle, the unintended door opening due to the wrong operation of the door lock switch 31 or unlock switch 32 may be avoided. After the mode is switched to the error mode 2, the opening operation of the door is possible by the unlock requirement from the unlock switch 32 and the door opening requirement from the inside switch 26, thereby assuring the occupant to escape from the inside of the vehicle. In addition, since the door is opened only by the unlock operation by the unlock switch 32 and the opening operation by the inside switch 26, the door may not be opened without the intention of the occupant.

Still further, the collision determination portion 23 controls all the doors provided at the vehicle in the unlocked state at the time of the mode of the main control portion 13 being switched to the error mode 3. Thus, the door can be opened from the outside of the vehicle after 10 seconds is elapsed from the detection of the vehicle collision. Thus, the occupant can be rescued from the outside of the vehicle after 10 seconds is elapsed from the vehicle collision. That is, when the switching time to the error mode 3 is set such that until which the vehicle is considered to stop even if the rollover is caused after the collision, the door is prevented from opening by the requirement of the door opening operation due to the wrong operation of the outside switch 25. In addition, after the mode is switched to the error mode 3 from the error mode 2, the opening operation of the door by the operation of the outside switch 25 becomes valid and thus the occupant is not prevented from being rescued from the outside of the vehicle.

Still further, the collision determination portion 23 controls the child safety lock switch 35 in the OFF state at the same time as the mode of the main control portion 13 being switched to the error mode 2. Thus, even if the vehicle collision occurs under the child safety lock switch 35 in the ON state, the occupant is assured to escape from the inside of the vehicle.

Still further, when the ignition switch 34 is in the OFF state, the collision determination portion 23 does not switch the mode of the main control portion 13 to the error mode 1 even if the collision detection sensor 33 detects the impact added to the vehicle. Thus, the mode of the main control portion 13 is not switched to the error mode 3 via the error mode 2 along with the passage of time. The door opening operation from the outside of the vehicle is thus prohibited. As a result, when the collision detection sensor 33 detects the impact added to the vehicle while the vehicle is being parked, for example, the door is prevented from being opened, thereby avoiding the vehicle theft and the like.

The embodiment of the present invention is not limited to the above and may be changed as follows.

According to the aforementioned embodiment, the error mode 1 is switched to the error mode 2 when the elapsed time measured by the collision detection timer reaches or exceeds 2 seconds. However, time required for switching the mode of the main control portion 13 from the error mode 1 to the error mode 2 can be appropriately changed.

According to the aforementioned embodiment, the error mode 2 is switched to the error mode 3 when the elapsed timed measured by the collision detection timer reaches or exceeds 10 seconds. However, time required for switching the mode of the main control portion 18 from the error mode 2 to the error mode 3 can be appropriately changed.

According to the above-mentioned embodiment, the collision determination portion 23 controls all the doors of the vehicle in the locked state at the same time as the mode of the main control portion 13 being switched to the error mode 2. However, all the doors of the vehicle require being in the locked state at least when the mode of the main control portion 13 is switched to the error mode 2. Thus, for example, all the doors of the vehicle may be controlled in the locked state at the same time as the mode of the main control portion 13 being switched to the error mode 1.

According to the above-mentioned embodiment, the input signal from the lock switch 31 is invalid when the main control portion 13 is in the error mode 2. However, the input signal from the unlock switch 32 only requires being valid and thus the input signal from the lock switch 31 can be valid.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A door lock apparatus for a vehicle comprising:

an outside switch provided outside of a vehicle for detecting an opening operation of a door from the outside of the vehicle;

an actuator for releasing an engagement of a latch mechanism of the door;

a control means electrically connected to the outside switch for driving the actuator in response to the opening operation of the door being detected by the outside switch; and a detecting means for detecting an impact added to the vehicle, wherein when the detecting means detects the impact added to the vehicle, the control means disables the opening operation of the door being detected by the outside switch within a first predetermined time from the detection of the impact.

2. A door lock apparatus for a vehicle according to claim 1, further comprising:

an inside switch provided inside of the vehicle for detecting the opening operation of the door from the inside of the vehicle; and the control means electrically connected to the inside switch for driving the actuator in response to the opening operation of the door being detected by the inside switch, wherein the control means disables the opening operation of the door being detected only by the outside switch after the elapse of the first predetermined time and within a second predetermined time from the detection of the impact.

3. A door lock apparatus for a vehicle according to claim 2, further comprising:

a lock/unlock switch for detecting a changing status of a lock/unlock operation of the door; and the control means electrically connected to the lock/unlock switch for controlling a lock/unlock state of the door in response to the lock/unlock operation of the door being detected by the lock/unlock switch, wherein the control means changes a door state into the locked state when the impact added to the vehicle is detected, and enables the change of the lock/unlock operation of the door being detected by the lock/unlock switch and the opening operation of the door being detected by the inside switch after the first predetermined time is elapsed.

4. A door lock apparatus for a vehicle according to claim 3, wherein when the detecting means detects the impact added to the vehicle, the control means changes the door state to the locked state and when the second predetermined time is elapsed after the impact is detected, the control means changes the door state to the unlocked state and at the same time enables the opening operation of the door being detected by the outside switch or the inside switch.

5. A door lock apparatus for a vehicle according to claim 1, further comprising:

a child safety lock switch for enabling or disenabling the opening operation of the door being detected by the inside switch, wherein when the detecting means detects the impact added to the vehicle, the control means cancels the disenabling of the opening operation of the door by the child safety door lock switch.

6. A door lock apparatus for a vehicle according to claim 5, wherein the detecting means includes a collision detection sensor for detecting the impact added to the vehicle using a G sensor.

7. A door lock apparatus for a vehicle according to claim 6, wherein the control means includes a main control portion having an operating switch determination portion, a door lock/unlock determination portion, and a collision determination portion.

8. A door lock apparatus for a vehicle according to claim 7, wherein the main control portion is electrically connected to a motor control portion connected to a motor provided at the door for driving the motor in response to a control signal from the main control portion so as to drive the actuator, and a power portion for converting a current supplied from a DC power connected to the power portion into a predetermined voltage or current.

9. A door lock apparatus for a vehicle according to claim 8, wherein the main control portion is electrically connected to the child safety lock switch, a door status switch, and a vehicle speed sensor.

10. A door lock apparatus for a vehicle according to claim 8, wherein the operating switch determination portion is electrically connected to the outside switch, the inside switch and a hold-open latch release inside switch.

11. A door lock apparatus for a vehicle according to claim 10, wherein the operating switch determination portion receives a signal from the outside switch, the inside switch, and the hold-open latch release inside switch in response to each opening operation thereof and determines whether or not a driving of the motor is required based on the received signal.

12. A door lock apparatus for a vehicle according to claim 11, wherein the door lock/unlock determination portion is electrically connected to the lock/unlock switch.

13. A door lock apparatus for a vehicle according to claim 12, wherein the door lock/unlock determination portion receives a signal from the lock/unlock switch and sends a signal to the operating switch determination portion for changing a state of the opening operation of the door into a prohibited state or a permitted state based on the received signal and a mode of the main control portion.

14. A door lock apparatus for a vehicle according to claim 7, wherein the collision determination portion is electrically connected to the collision detection sensor and an ignition switch.

15. A door lock apparatus for a vehicle according to claim 14, wherein the collision determination portion changes a mode of the main control portion based on a received signal from the collision detection sensor and the ignition switch.

16. A door lock apparatus for a vehicle according to claim 15, wherein the collision determination portion changes the mode of the main control portion to a first error mode when the impact added to the vehicle is detected and the ignition switch is in an ON position.

17. A door lock apparatus for a vehicle according to claim 16, wherein the collision determination portion changes the mode of the main control portion to a second error mode when the first predetermined time is elapsed after the impact added to the vehicle is detected.

18. A door lock apparatus for a vehicle according to claim 17, wherein the collision determination portion changes the mode of the main control portion to a third error mode when the second predetermined time is elapsed after the impact added to the vehicle is detected.

* * * * *